(12) United States Patent
Drexler et al.

(10) Patent No.: US 12,526,046 B2
(45) Date of Patent: Jan. 13, 2026

(54) MULTI-DIRECTIONAL OPTICAL COMMUNICATIONS SYSTEM AND METHOD WITH TURBULENCE MITIGATION USING HOMODYNE ENCODING

(71) Applicant: United States of America as represented by the Secretary of the Navy, San Diego, CA (US)

(72) Inventors: Kyle Robert Drexler, San Diego, CA (US); Burton Hamilton Neuner, III, San Diego, CA (US); Skylar Darious Jones Lilledahl, San Diego, CA (US); Benjamin Laxton, San Diego, CA (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 484 days.

(21) Appl. No.: 18/191,244

(22) Filed: Mar. 28, 2023

(65) Prior Publication Data
US 2024/0333387 A1     Oct. 3, 2024

(51) Int. Cl.
*H04B 10/00* (2013.01)
*H04B 10/112* (2013.01)

(52) U.S. Cl.
CPC ..... *H04B 10/1123* (2013.01); *H04B 10/1129* (2013.01)

(58) Field of Classification Search
CPC ............ H04B 10/1123; H04B 10/1125; H04B 10/1129; H04B 10/114; H04B 10/1143; H04B 10/1149; H04B 10/116; H04B 10/118; H04B 10/40; H04B 10/0795; H04B 10/07955; H04B 10/63; H04B 10/64; H04B 10/69; H04B 10/671; H04B 10/672
USPC ....... 398/118, 119, 120, 121, 122, 123, 124, 398/125, 126, 127, 128, 129, 130, 131, 398/135, 136, 158, 159, 33, 38, 25, 26, 398/27, 172, 202, 208, 209
See application file for complete search history.

(56) References Cited

U.S. PATENT DOCUMENTS

| | | | |
|---|---|---|---|
| 7,343,099 B2 * | 3/2008 | Wirth | G02B 26/06 398/131 |
| 7,773,204 B1 | 8/2010 | Nelson | |
| 9,236,939 B2 * | 1/2016 | Wayne | H04B 10/07955 |
| 10,432,318 B2 * | 10/2019 | Arikawa | H04B 10/6165 |
| 2010/0080565 A1 * | 4/2010 | Li | H04B 10/1121 398/208 |
| 2013/0206963 A1 | 8/2013 | Grund | |
| 2014/0126902 A1 | 5/2014 | Swanson et al. | |
| 2016/0204866 A1 | 7/2016 | Boroson et al. | |

(Continued)

OTHER PUBLICATIONS

Kyle Drexler and Kyle Watson, "Digital Adaptive Optics," Imaging and Applied Optics 2017, OSA Technical Digest, paper CM2B.4, 2017.

(Continued)

*Primary Examiner* — Hanh Phan
(74) *Attorney, Agent, or Firm* — Naval Information Warfare Center, Pacific; Kyle Eppele; Paul C. Oestreich

(57) ABSTRACT

Embodiments of the present invention include free-space optical communication systems and methods employing homodyne encoding on the receiver sides of the terminals that are configured to mitigate optical degradation due to atmospheric turbulence.

24 Claims, 11 Drawing Sheets

(56) References Cited

U.S. PATENT DOCUMENTS

2018/0249100 A1     8/2018   Watson et al.
2023/0085936 A1*   3/2023   Erkmen ............... H04B 10/112
                                                                                  398/130

OTHER PUBLICATIONS

Jun Guan, Paul Köchert, Christoph Weichert and Rainer Tutsch, "A High Performance One-Dimensional Homodyne Encoder and the Proof of Principle of a Novel Two-Dimensional Homodyne Encoder", Precision Engineering 37 (2013), pp. 865-870.

Burton Neuner III, Skylar D. Lilledahl, Benjamin Laxton and Kyle R. Drexler, "Digital Adaptive Optics with Interferometric Homodyne Encoding for Mitigating Atmospheric Turbulence", Optical Engineering, vol. 62(2), Feb. 2023, pp. 023104-1-15.

Haoqian Song, Hao Song, Runzhou Zhang, Karapet Manukyan, Lon Li, Zhe Zhao, Kai Pang, Cong Liu, Ahmed Almaiman, Robert Bock, Brittany Lyn, Moshe Tur and Alan E. Willner, Experimental Mitigation of Atmospheric Turbulence Effect Using Pre-Signal Combining for Uni- and Bi-Directional Free-Space Optical Links with Two 100-Gbit/s OAM-Multiplexed Channels, Journal of Lightwave Technology, JLT-24397-2019.R1, 2019, pp. 1-7.

Luca Rinaldi, Doctoral Thesis: "Mitigation of Atmospheric Turbulence Effects on Optical Links by Integrated Optics", Optics / Photonic Université Paris-Saclay, NNT: 2022UPASP013, Feb. 2, 2022, pp. 1-143.

Hemani Kaushal and Georges Kaddoum, "Optical Communication in Space: Challenges and Mitigation Techniques", arXiv:1705.10630v1 [cs.IT] May 28, 2017, pp. 1-41.

Masoud Ghalaii and Stefano Pirandola, "Quantum Communications in a Moderate-to-Strong Turbulent Space", Communications Physics, (2022) 5:38, https//doi.org/10.1038/s42005-022-00814-5, 2022, pp. 1-12.

Shengmei Zhao, Bei Wang, Li Zhou, Longyan Gong, Wenwen Cheng, Yobo Sheng and Baoyu Zheng, "Turbulence Mitigation Scheme for Optical Communications Using Orbital Angular Momentum Multiplexing Based on Channel Coding and Wavefront Correction", arXiv:1401.7558v1 [physics.optics] Jan. 29, 2014, Draft Jun. 14, 2021, pp. 1-18.

* cited by examiner

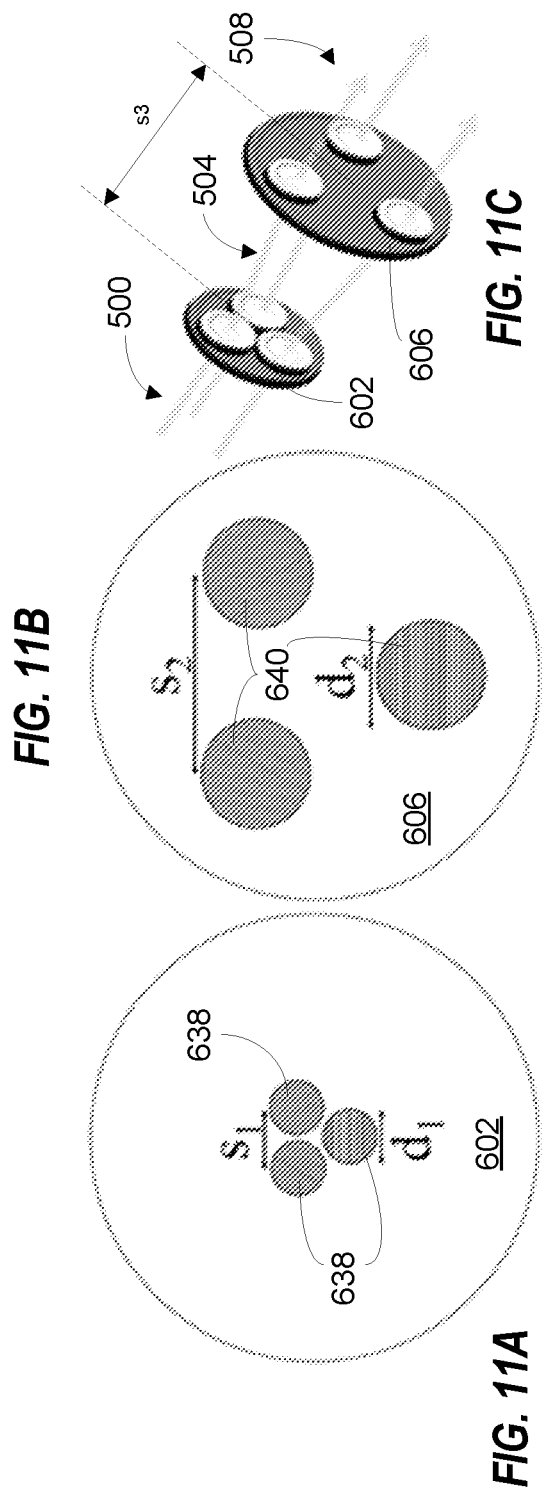
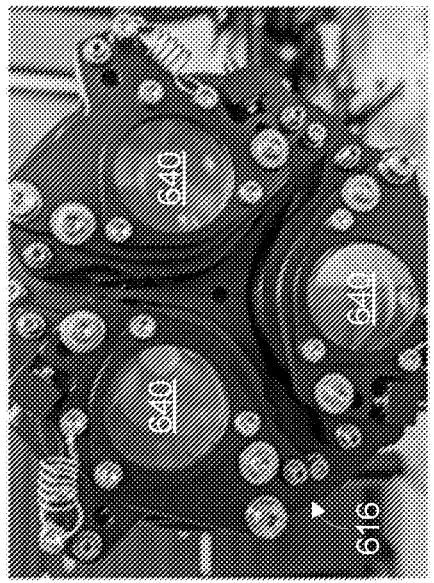
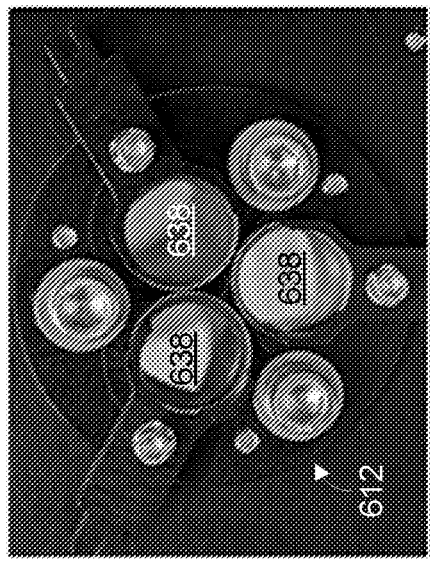
FIG. 11A  FIG. 11B  FIG. 11C  FIG. 11D  FIG. 11E

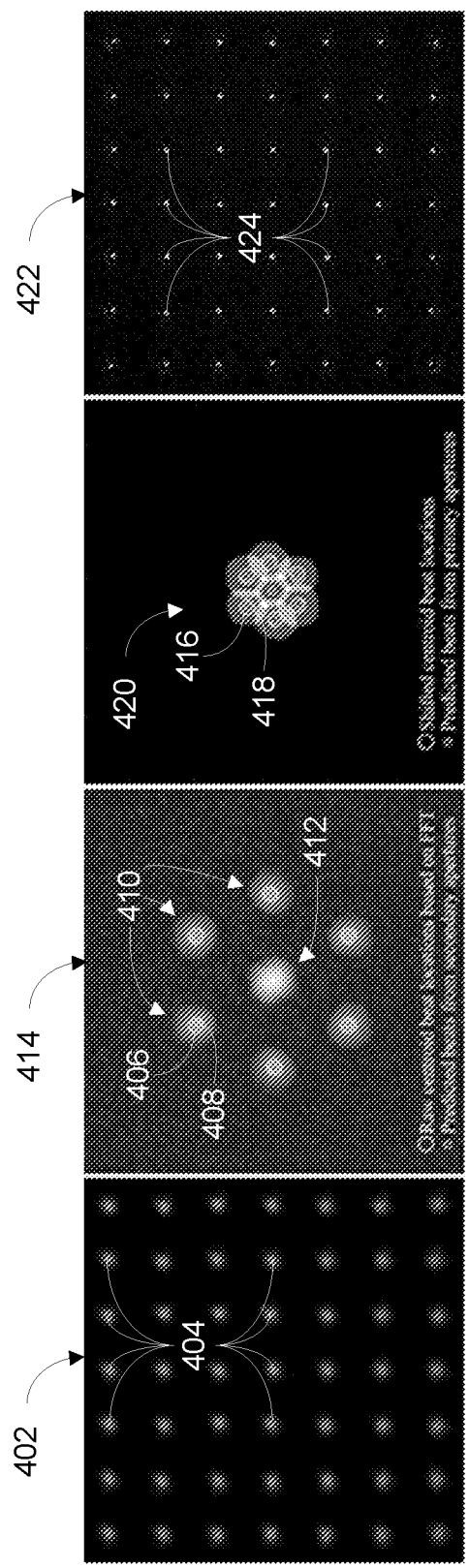

MULTI-DIRECTIONAL OPTICAL COMMUNICATIONS SYSTEM AND METHOD WITH TURBULENCE MITIGATION USING HOMODYNE ENCODING

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211050.

CROSS-REFERENCE TO RELATED APPLICATIONS

This US non-provisional utility patent application is related to US non-provisional utility patent application Ser. No. 17/679,423, filed, Feb. 24, 2022, titled, HOMODYNE ENCODER SYSTEM WITH ADAPTIVE PATH LENGTH MATCHING issued as U.S. Pat. No. 11,703,318 B1, on Jul. 18, 2023. This US non-provisional utility patent application is also related to US non-provisional utility patent application Ser. No. 17/873,010, filed, Jul. 25, 2022, titled, MULTI-BAND HOMODYNE ENCODER, expired. This US non-provisional utility patent application is also related to US non-provisional utility patent application Ser. No. 17/873,333, filed, Jul. 26, 2022, titled, DIGITAL ADAPTIVE OPTICS ENCODER MODULE, issued as U.S. Pat. No. 12,379,576. Aug. 5, 2025. The contents of each of these related US patent applications are hereby incorporated by reference for all purposes as if fully set forth herein.

BACKGROUND OF THE INVENTION

Field of the Invention

The present invention relates generally to optical communications systems. More particularly, the invention relates to multi-directional optical communications systems and methods with turbulence mitigation using homodyne encoding.

Description of Related Art

Free-space optical communications systems, whether mono-directional, bi-directional, monostatic, bi-static, or multi-static can be inherently degraded due to heterogenous medium anomalies such as atmospheric turbulence.

There exists a need in the art for improved optical communications in the presence of optical medium anomalies such as atmospheric turbulence.

SUMMARY OF THE INVENTION

Methods and systems for optical communications employing homodyne encoding are disclosed. The embodiments of methods and systems for optical communication disclosed herein are particularly useful for correcting optical signal distortion caused by atmospheric turbulence during transmission through a medium.

An embodiment of a method for homodyne aperture reconstruction of a spatially encoded optical source light signal corrupted by atmospheric turbulence sent from a remote optical source is disclosed. The method embodiment may include providing a system for the homodyne aperture reconstruction for receiving the source light signal. The method embodiment may further include physically separating the source light signal to generate laterally separated light. The method embodiment may further include collimating the laterally separated light to obtain laterally separated collimated light. The method embodiment may further include focusing the laterally separated collimated light. The method embodiment may further include capturing a time sample of the laterally separated collimated light using the sensor. The method embodiment may further include extracting spatially separated beat terms from the time sample. The method embodiment may further include determining phase errors in the time sample of the spatially separated beat terms to obtain phase corrected optical data. The method embodiment may further include determining jitter correction in the phase corrected optical data to obtain jitter corrected optical data. The method embodiment may further include deconvolving the jitter corrected data using estimated power and noise spectra to obtain deconvolved optical data. The method embodiment may further include recombining the deconvolved optical data to obtain a corrected light signal.

An embodiment of a system for homodyne aperture reconstruction of a spatially encoded optical source light signal corrupted by atmospheric turbulence sent from a remote optical source is disclosed. The embodiment of the system may include an input optical setup module configured to receive the corrupted light signal and present a focused, laterally separated, corrupted light signal. The system embodiment may further include a data acquisition module configured to capture at least one time sample of the focused, laterally separated, corrupted light signal. The system embodiment may further include an image processing module configured to correct phase errors and jitter in the at least one time sample and generate corrected image data.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 11A is schematic diagram of a primary beam separating three-aperture interferometer, according to the present invention.

FIG. 11B is schematic diagram of a secondary collimating three-aperture interferometer, according to the present invention.

FIG. 11C is schematic diagram of the light paths through the primary three-aperture and secondary three-aperture interferometers of FIGS. 11A and 11B, respectively, according to the present invention.

FIG. 11D is an image of a primary three-aperture interferometer assembly, according to the present invention.

FIG. 11E is an image of a secondary three-aperture interferometer assembly, according to the present invention.

FIG. 12A is an image of an embodiment of an initial 7×7 calibration data grid, according to the present invention.

FIG. 12B is an image of an embodiment of a two-dimensional (2D) Fast Fourier Transform (FFT) performed on the image intensity data shown in FIG. 12A, according to the present invention.

FIG. 12C is an image of an embodiment of the Fourier space after spatially shifting the frequency information back to the correct (i.e., natural, non-diffracted) locations, according to the present invention.

FIG. 12D is an image of the normal point source images from the calibration grid after compensating for inherent phase errors and then removing the moiré pattern in an embodiment of the system for homodyne aperture reconstruction, according to the present invention.

DETAILED DESCRIPTION

Figure 1:
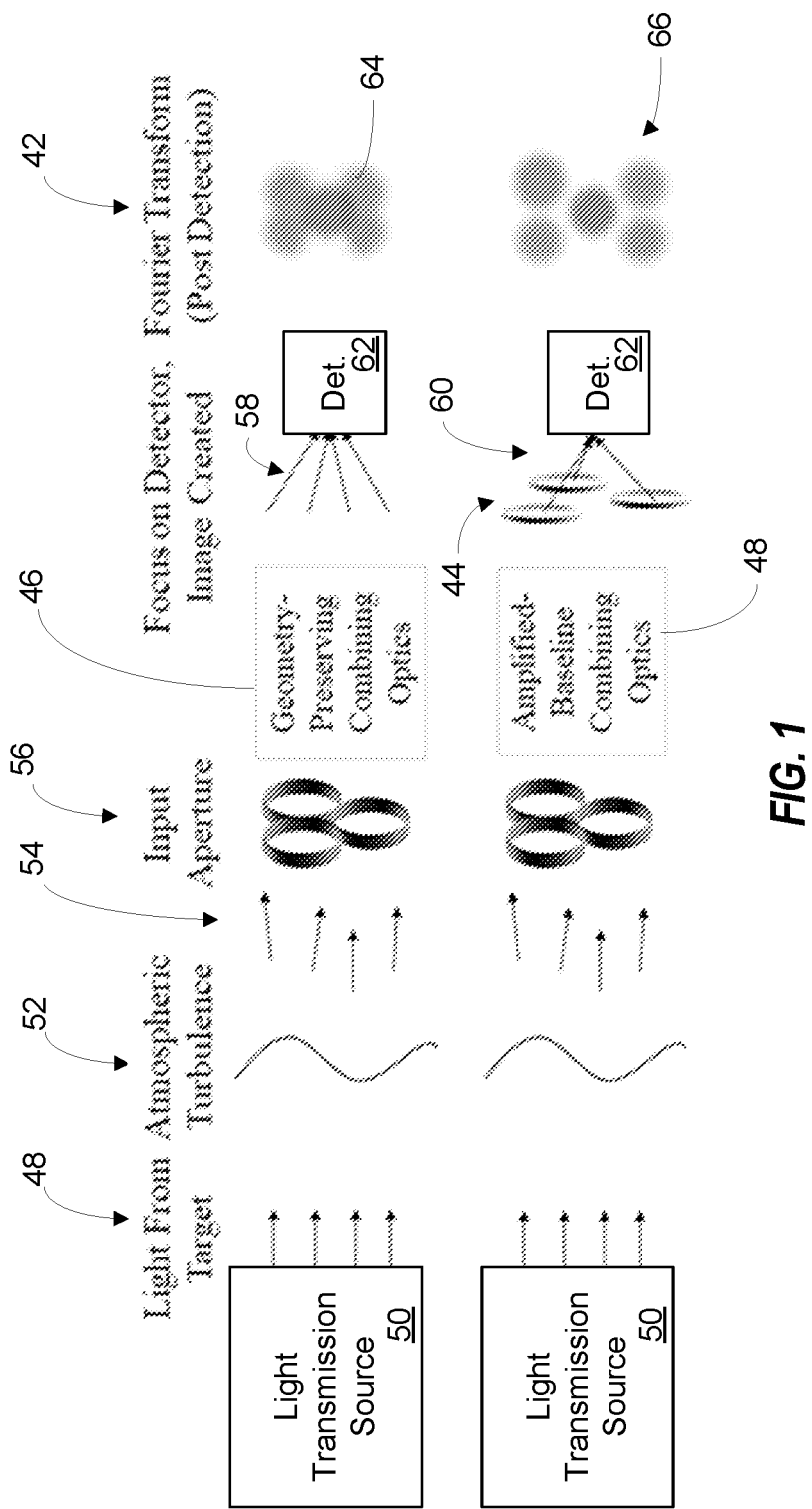
FIG. 1 illustrates input optical setup and data acquisition with (and without) the embodiments of homodyne encoding technique, according to the present invention.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The various embodiments of the present invention solve the technical problem of optical communication in the presence of heterogenous transmission medium anomalies such as atmospheric turbulence. Embodiments of the present invention include optical communication systems that mitigate turbulence within heterogenous media by transmitting spatially encoded data and receiving data using a homodyne encoding optical technique. Embodiments of the present invention rely on advanced receiver technology and thus can be implemented without additional transmitter complications. This technique works over the entire field of view and enables simultaneous communication with additional transceivers.

It will be understood that any of the methods described herein may be implemented in a combination of computer hardware, software and optical hardware that may be automated or under user control. It will be further understood that embodiments of non-transitory computer readable media may be used to store computer instructions for implementing the methods described herein. In addition to the detailed description of the present invention provided herein, further detail may be found in a counterpart technical paper authored by the inventors, namely, Burton Neuner III, Skylar D. Lilledahl, Benjamin Laxton and Kyle R. Drexler, "Digital Adaptive Optics with Interferometric Homodyne Encoding for Mitigating Atmospheric Turbulence", Optical Engineering, Vol. 62(2), February 2023, pp. 023104-1-15, the contents of which are incorporated by reference herein for all purposes as if fully set forth herein.

As noted above free-space optical communications systems can be inherently degraded due to heterogenous medium anomalies such as atmospheric turbulence. Speckle, speckle patterns, and speckle noise are generated when light waves or signals self-interfere. For example, when light propagates through turbulent media, speckle patterns show peaks and nulls that evolve with time. Optical systems often display different types of speckle noise. Adding homodyne encoding to the receiver portion of these free-space optical communications systems enable these systems to mitigate for this degradation.

In the context of this disclosure, the following concepts are used. A mono-directional communication system is one that sends information in only one direction from a transmitter terminal to a receiver terminal (also known as simplex). In a bi-directional system, information is both sent and received by each transmitter/receiver (transceiver) terminal. The terms "transceiver" and "terminal" are used interchangeable herein to signify a device or devices configured for optical transmission and reception of light signals.

In a monostatic configuration, the terminal's transmitter and receiver components may be co-located within a single system. In a bi-static configuration, the transmitter and receiver may be separated by a distance much larger than the scale of the transceiver itself. In a multi-static configuration, multiple monostatic or bi-static terminals may be placed within a shared field of view, enabling mono-directional or bi-directional communication between terminals.

Embodiments of the present invention include free-space optical communication systems and methods employing homodyne encoding on the receiver sides of the terminals that are configured to mitigate optical degradation. System embodiments of the present invention may be composed of a combination of mono-directional and bi-directional terminals operating in monostatic, bi-static, or multi-static modes. The invention is ideal for environments that exhibit degradation dominated by atmospheric optical turbulence. In most natural waters such as oceans and lakes, scattering is the dominant contributor to optical degradation. However, in cases of clear water, turbulence may be the dominant contributor to optical degradation. Thus, this invention is useful for enhanced imaging and communication through natural waters.

In the context of wireless communication, a medium is considered heterogeneous (or inhomogeneous) when physical variations occur along or in the vicinity of the communication path, including the following: temperature, density, humidity, salinity, molecular composition, and particulate matter. For example, atmospheric optical turbulence is generally caused by local variations in air temperature and density, resulting in fluctuating indices of refraction and subsequent irregularities in imaging and optical communication.

Homodyne encoding signifies that the system uses a single frame of data for extracting environmental information, spatially encoded as modulation of the oscillating signal's phase and/or frequency. This is in contrast to heterodyne encoding, which employs temporal phase shifting and multiple frames to enable phase and frequency analysis. Because the homodyne approach employs a single frame and static spatial phase shifters, the system is less complex.

Optical communication provides several advantages when compared to radio frequency (RF) communication, including but not limited to the following: the upper limit of data transfer is generally higher, the frequency spectrum is not pre-allocated/controlled by governing bodies, the optical signal can be visually observed and/or avoided if necessary when the channel falls within the visible spectrum, and the signal can propagate through seawater up to 100 s of meters when the channel falls within the blue/green part of the visible spectrum.

FIG. 1 illustrates input optical setup and data acquisition without (top path) and with (bottom path) the embodiments of homodyne encoding technique, according to the present invention. More particularly, the top path illustrates a general embodiment of an optical system employing geometry-preserving combining optics. The bottom path shown in FIG. 1 illustrates the novel optical system employing amplified-baseline combining optics described herein. As show in the top path of FIG. 1 starting from the left, spatially encoded light, shown generally at arrow 48 and depicted as four arrows originating from a light transmission source 50 encounters atmospheric turbulence, shown generally at arrow 52 and depicted as a wavy line graphically, as it passes through a given medium (i.e., air or water) which introduces distortions in the light, shown generally at 54 and depicted as non-parallel arrows graphically. The distorted light 54 enters an input (primary) aperture, shown generally at arrow 56 and depicted as 3 adjacent rings graphically. By employing geometry preserving combining optics 46, the focused light, shown generally at arrow 58 and depicted graphically as four converging arrows, converge onto a detector (sensor) 62 for sampling and image capture. When computing a 2-dimensional (2D) Fast Fourier Transform (FFT), shown generally at arrow 42, on the intensity of the focused light 58 from the image captured along the top path, the frequency information 64 (shown as fuzzy overlapping colored circles) is overlapped and non-separable. Thus, the top path shown in FIG. 1 illustrates a technical problem solved by the present invention.

As shown in the bottom path of FIG. 1 starting from the left, spatially encoded light 48 originating from a light transmission source 50 again encounters atmospheric turbulence 52 introducing distortions in the light 54. The distorted light 54 enters an input (primary) aperture 56 just as in the top path. Rather than using geometry preserving combining optics 46, amplified baseline combining optics 48 are employed to laterally separate, collimate the light using a secondary aperture, shown generally at arrow 44 and depicted as three separated circles followed by focusing the separated collimated light, shown generally at arrow 60 and depicted as converging arrows originating from the secondary aperture 44. The separated collimated light is focused 60 onto a detector 62 where an image is created. In contrast to the top path, the application of a 2D FFT to the image from the detector 62 results in separated frequency information, shown generally at arrow 66 and depicted as fuzzy separated colored circles. This separated frequency information 66 allows for extraction and injection into a novel eigen value system solver to correct for atmospheric phase errors and to recover lost information in the original source image from the light transmission source 50. Detailed description of the novel image processing of the present invention can be found herein with reference to FIGS. 7 and 8 and related description.

Figure 2:
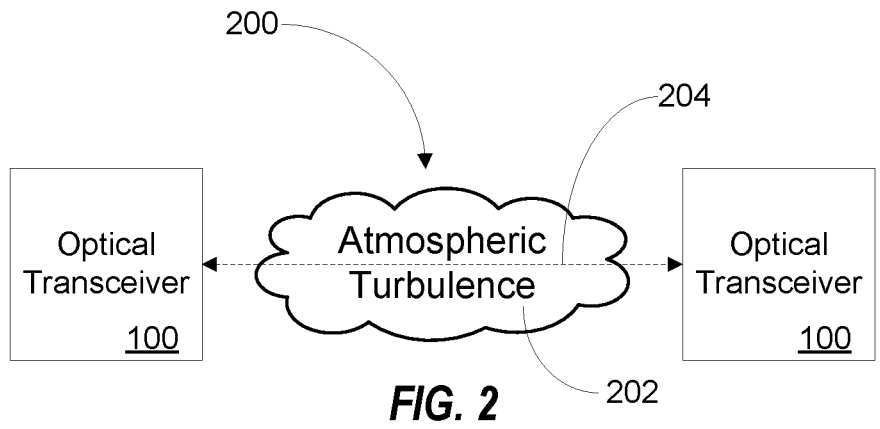
FIG. 2 is a block diagram of an embodiment of a point-to-point optical communications system for mitigating turbulence in optical light signals, according to the present invention.

FIG. 2 is a block diagram of an embodiment of a point-to-point optical communications system 200 for mitigating the signal distortion caused by atmospheric turbulence 202 in optical light signals, according to the present invention. System 200 may include two optical transceivers 100 separated by any arbitrary distance along an optical path, shown as dashed line 204, passing through an optical medium (e.g., air) which may or may not include atmospheric turbulence 202 as described herein.

Embodiments of the present invention may further include two or more terminals (transmitters, receivers, and/or transceivers) distributed within mutual operational ranges to form an imaging or communication network. Thus, an optical communications network employing embodiments of the homodyne encoding system and method of the present invention are also disclosed.

Figure 3:
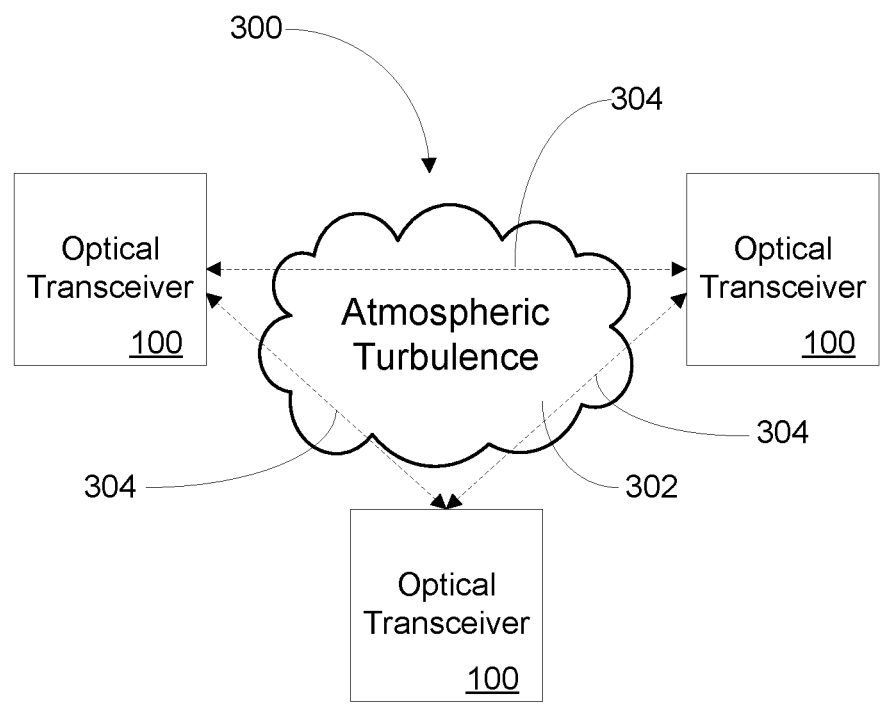
FIG. 3 is a block diagram of an embodiment of a network optical communications system for mitigating signal distortion caused by atmospheric turbulence in optical light signals, according to the present invention.

FIG. 3 is a block diagram of an embodiment of a network optical communications system 300 for mitigating the signal distortion caused by atmospheric turbulence 302 in optical light signals, according to the present invention. System 300 may include three or more optical transceivers 100 (only three shown in FIG. 3 for simplicity) each separated by any arbitrary distance along optical paths, shown as dashed lines 304, passing through an optical medium (e.g., air) which may or may not include turbulence 302 as described herein. Systems 200 and 300 may have any combination of monodirectional or bi-directional communication paths 204 and 304 between transceivers 100.

Figure 4:
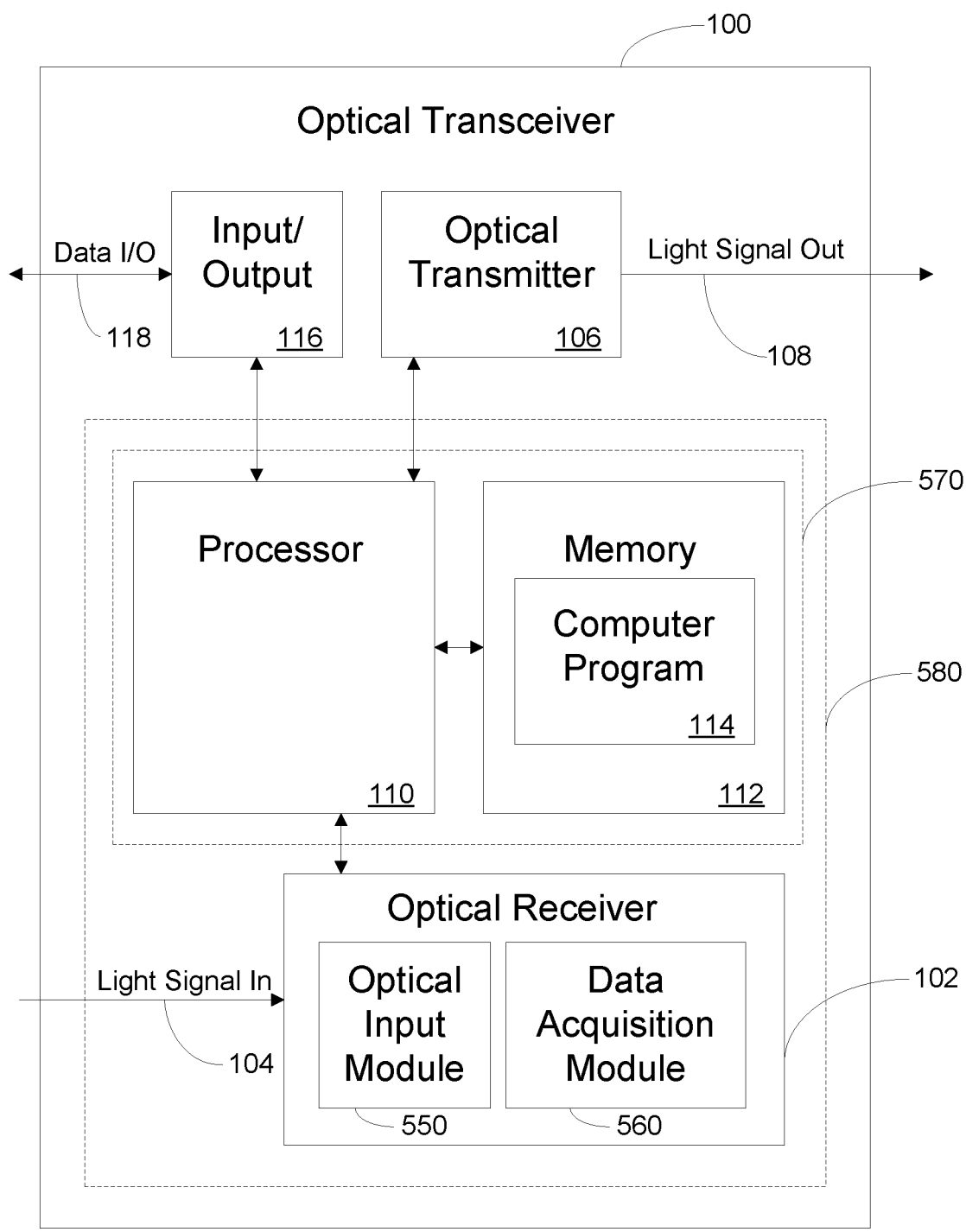
FIG. 4 is a block diagram of an embodiment of an optical transceiver, according to the present invention.

FIG. 4 is a block diagram of an embodiment of an optical transceiver 100, according to the present invention. Optical transceiver 100 may include an optical receiver 102 configured for receiving a light signal 104 transmitted from an optical source (not shown in FIG. 4). According to one embodiment, receiver 102 may include an input optical setup module 550 and data acquisition module 560 further described with reference to FIGS. 5 and 6, herein. Optical transceiver 100 may further include an optical transmitter 106 configured for transmitting a light signal 108. Optical transceiver 100 may further include a processor 110 in communication with the optical transmitter 106 and the optical receiver 102 and configured for controlling the operations of each. Optical transceiver 100 may further include a memory 112 in communication with the processor 110. Memory 112 may be configured for storing data, including received 104 and transmitted 108 light signals and more particularly their image data analogs as they are being processed according the method described herein. Memory 112 may further be configured to store a computer program 114 configured with computer instructions for implementing methods of processing optical signals according to the present invention. The computer program 114 may be implemented in firmware or stored dynamically, according to various embodiments.

According to general embodiments, processor 110 may include a general purpose microprocessor, a specialized application specific integrated circuit (ASIC), a customized floating point gate array (FPGA), or any higher order processing module at the circuit board or full personal or larger computer level of integration. Such processors are well known to those of ordinary skill in the art and thus will not be further elaborated herein. According to general embodiments, a memory 112 may be any suitable computer memory implemented in static or dynamic semiconductor configuration, magnetic or optical disk memory configurations, or any other suitable computer memory for storing and retrieving data and computer instructions, consistent with the teachings of the present invention. Such a memory 112 is also well-known to those of ordinary skill in the art and thus will not be further elaborated herein. Optical transceiver 100 may further include an input/output module 116 in communication with processor 110 and configured for interfacing with other system components (not shown) and ultimately the user (not shown) of the optical transceiver 100. Again, such I/O interfaces 116 and user input devices (e.g., keyboard, mouse, monitor, printer, etc.) are also well-known to those of ordinary skill in the art and thus will not be further elaborated herein.

A particular embodiment for implementing processor 110, memory 112 and I/O 116 may include, for example and not by way of limitation, a combination of a PJRC Teensy® 4.0 Microcontroller, available from PJRC.COM LLC, 14723 S.W. Brooke Court, Sherwood, OR 97140, in communication with an Intel® NUC data acquisition mini personal computer (PC), available from Intel Corporation, 2200 Mission College Blvd, Santa Clara, CA 95054, and in communication with receiver 102 and configured for receiving image data from a sensor (see 514, FIG. 6) within receiver 102. It will be understood that any suitable combination of a processor 110, memory 112 and I/O 116 with or without computer software programming may be used consistent with the present invention. It will be understood that various combinations of hardware, firmware and/or software may be used to implement the present invention.

As shown in FIG. 4, embodiments of the present invention may include an optical transmitter 106 for generating and sending information. Embodiments of an optical transmitter 106 may include any suitable optical transmitter capable of spatially encoding data or any other optical signal or information and transmitting that data, signal or information within a heterogenous medium. The heterogenous medium could include but is not limited to the atmosphere and to the underwater environment. For example and not by way of limitation, embodiments of the optical transmitter 106 may be an e-ink reader (not shown), an electronically controlled panel with encoded elements (not shown), an illuminated panel (not shown), a controllable light (not shown) or light amplification by stimulated emission of radiation (LASER) transmitting device (not shown) using various means of spatially encoding data, or any other optical signal that is transmitting information within a heterogenous medium. Such exemplary optical transmitters are well known to those of ordinary skill in the art and thus will not be further elaborated herein.

When the embodiment of an optical transmitter 106 is an e-ink reader or other electronically controlled panel, the transmitter 106 may be considered passive, as it is generating a two-dimensional image at the receiver (or terminal), but it is not directing electromagnetic radiation (light) toward the receiving terminal. When using light or laser sources, the transmitter is considered active, as it is generating and directing a two-dimensional array of encoded data towards the optical receiver 102.

As shown in FIG. 4, embodiments of the present invention may further include an optical receiver 102 for collecting the transmitted information. Embodiments of the optical receiver 102 according to the present invention may include a sensor array and matched homodyne encoding system for analyzing and mitigating communication degradation caused by the environment (i.e., transmission medium). The simplicity of using homodyne encoding is that it only requires a single frame of data to mitigate atmospheric turbulence, which will lead to an increased communication bandwidth.

Once that single image frame is collected, the receiver optics extracts the spatially separated beat terms. According to an embodiment of a method of image processing according to the present invention, a phase tilt solver and jitter correction may be applied. Image deconvolution then proceeds using estimated power and noise spectra. Finally, the processed data are recombined into a corrected image. Method embodiments may be implemented in software (computer program instructions).

As shown in FIG. 4, embodiments of the present invention may further include a processor 110 to control and synchronize both the optical transmitter 106 and the optical receiver 102 along with any necessary networking equipment or input/output module 116 to relay the information, including a corrected optical signal, to its final destination via data I/O 118 or via optical transmitter 106. It will be understood that the present invention may further include computer memory 112 in communication with the processor 110, the memory 112 configured for storing executable computer instructions, or computer program 114. Such a computer program 114 may be configured for implementing embodiments of the image processing method as well as storing pre- and post-processed image data according to various method embodiments of the present invention.

Figure 5:
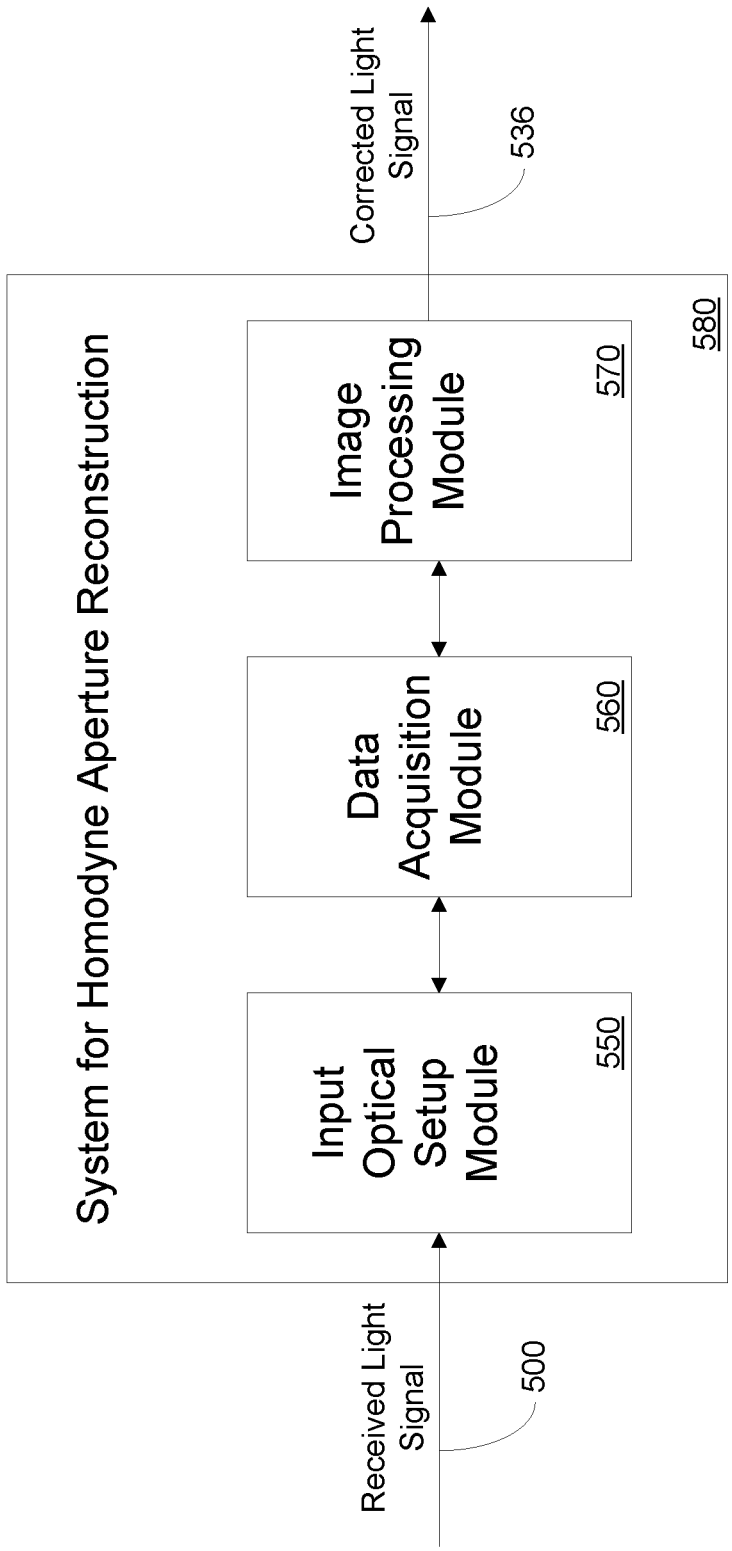
FIG. 5 is a high-level block diagram of an embodiment of a system for homodyne aperture reconstruction, according to the present invention.

FIG. 5 is a high-level block diagram of an embodiment of a system 580 for homodyne aperture reconstruction of an optical signal corrupted by atmospheric turbulence, according to the present invention. System 580 may be included in an optical transceiver 100 (see, FIG. 4). The three main aspects of system 580 may generally include optical separation, acquiring a frame of optical data and a combination of hardware and software elements for synthesizing the reconstructed image, according to particular embodiments of the present invention.

Figure 6:
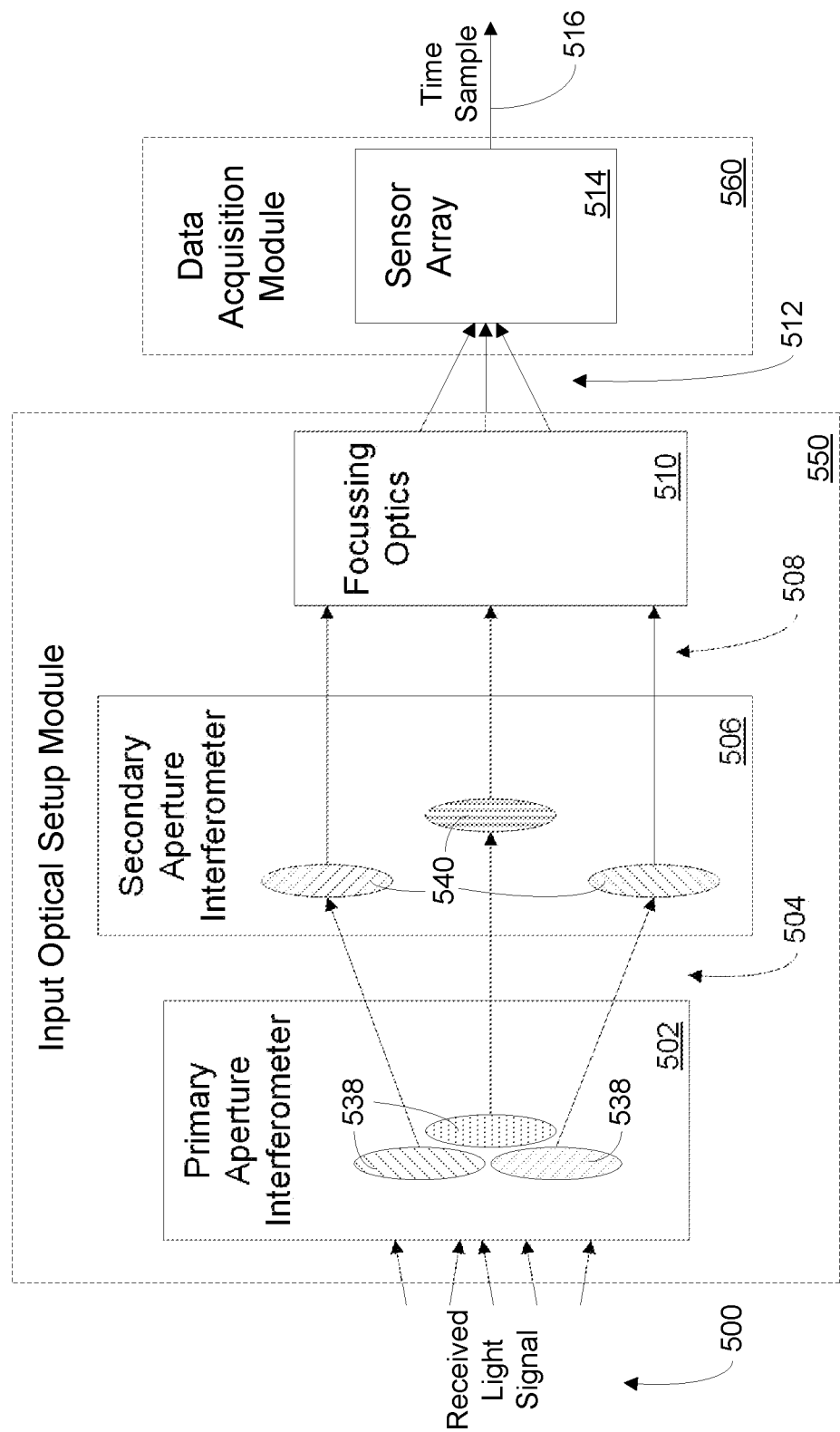
FIG. 6 is a block diagram of input optical setup and data acquisition modules configured for homodyne aperture reconstruction, according to the present invention.
Figure 7:
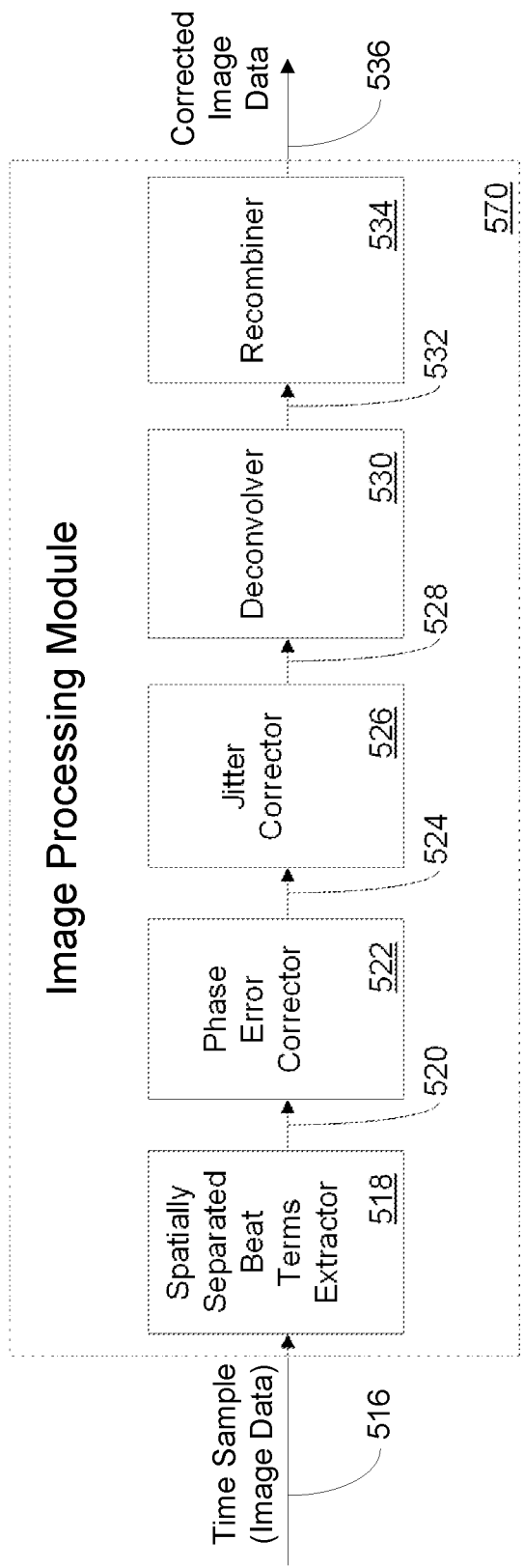
FIG. 7 is a block diagram of an embodiment of an image processing module configured for homodyne aperture reconstruction, according to the present invention.

As shown generally in FIG. 5, system 580 may include an input optical setup module 550 configured for receiving light signal 502. Input optical setup module 550 is in communication with a data acquisition module 560, which in turn is in communication with an image processing module 570 configured to output a corrected light signal 536. It will be understood that techniques for converting a light signal to and from optical image data are well known to those of ordinary skill in the art and thus will not be further elaborated herein. FIG. 6 provides additional detail regarding input optical setup module 550 and data acquisition module 560. FIG. 7 provides additional detail regarding image processing module 570.

Generally, the homodyne interferometry component of system 580 may be achieved by employing specialized optics in front of the system's final focusing optics to sub-divide the input aperture of the imaging system into laterally separated sub-apertures. This separated light is subsequently collimated and then passed to focusing optics to create an image with an interference pattern on a data acquisition sensor. The primary optical component used to create the interference pattern is a diffraction-grating-based interferometer which creates sub-apertures and spatially separates the sub-apertures before data acquisition.

More particularly and as shown in FIG. 6, the input optical setup module 550 may include a primary three-input aperture 502 configured to receive light signal, shown generally at arrow 500 and graphically as five non-parallel arrows. The light signal 500 originated from a light source (not shown) having passed through a transmission medium (e.g., atmosphere or sea water, again not shown) which may or may not have introduced distortion from atmospheric turbulence (as described herein). Each of the three primary apertures 538 may incorporate a diffraction grating configured for separating light into its constituent frequencies. The embodiment of three-input primary aperture 502 may be configured to generate separated light, shown generally at arrow 504 and graphically as three diverging arrows. Particular embodiments of a three-input primary aperture 502 are shown in FIGS. 11A, 11C and 11D along with related description herein. Note that the individual primary apertures 538 shown in FIG. 6 are not shown to scale or precise location, but may be configured close to one another and not overlapping, again see for example FIGS. 11A, 11C and 11D.

The input optical setup module 550 shown in FIG. 6 may further include a three-input secondary aperture 506 configured to collimated light, shown generally at arrow 508 and graphically as three parallel arrows, received from the three-input primary aperture 502. Each of the individual secondary apertures 540 may also include diffraction gratings to generate interference patterns. Particular embodiments of a secondary aperture 506 are shown in FIGS. 11B, 11C and 11E, along with related description herein. Note that the individual secondary apertures 540 shown in FIG. 6 are not shown to scale or precise location, but may be configured apart from one another, again see for example FIGS. 11A, 11C and 11D. According to particular embodiments, the separation of the light signals may be achieved by matched pairs of diffraction gratings formed in the primary 538 and secondary 540 apertures. More particularly, the primary aperture 538 gratings diverge the three beams 504 in angular space, with secondary aperture 540 gratings re-collimating the light 508. The term "matched" as used herein refers to optically aligned apertures from primary to secondary.

Embodiments of the input optical setup module 550 shown in FIG. 6 may further include focusing optics 510 configured to receive the collimated light 508 from the secondary aperture 506 and generate focused light, shown generally at arrow 512 and graphically as three arrows converging to the right. Embodiments of the input optical setup module 550 may further include a sensor array 514 for receiving the focused light 512 from the focusing optics 510. An embodiment of the sensor array 514 may be configured to capture at least one time sample 516 of the focused light 512. A particular embodiment of a sensor array 514 may include a visible-band camera. A still more particular embodiment of a sensor array 514 may be a Blackfly® S, Model No. BFS-U3-32S4M, sensor available from FLIR Systems, Inc., 6769 Hollister Ave., Goleta, CA, a division of Teledyne FLIR LLC. It will be understood that sensor array 514 may be any suitable optical image sensor consistent with the teachings of the present invention.

As shown in FIG. 7, a general embodiment of the image processing module 570 may include a spatially separated beat terms extractor 518 in communication with a phase error extractor 522, which is in turn in communication with a jitter corrector 526, which is in turn in communication with a deconvolver 530, which is in turn in communication with a recombiner 534. More particularly, the illustrated embodiment of a spatially separated beat terms extractor 518 may be configured to receive the at least one time sample 516 from the data acquisition module 560 (FIG. 6). The embodiment of a spatially separated beat terms extractor 518 may further be configured to extract spatially separated beat terms 520 from the at least one time sample 516 of the laterally separated light 508 (FIG. 6). The embodiment of a phase error extractor 522 may be configured to receive the spatially separated beat terms 520 from extractor 518. The embodiment of a phase error extractor 522 may be configured to generate phase corrected optical data 524. The embodiment of a jitter corrector 526 may be configured to receive the phase corrected optical data 524 and generate jitter corrected optical data 528. The embodiment of a deconvolver 530 may be configured to receive the jitter corrected optical data 528 and generate deconvolved data 532. Finally, the recombiner 534 may be configured to receive the deconvolved data 532 to obtain a corrected image data 536 (corrected light signal). It will be understood that image processing module 570 may be implemented in software method steps (more particularly, computer program instructions) stored in one or more computer programs 114 (FIG. 4), executed by a processor 110 (FIG. 4) once the at least one time sample of the laterally separated collimated light has been captured by the sensor array 514. Additional aspects of the image reconstruction according the present invention follows.

According to a particular embodiment of the image processing module 570, a novel eigen value system solver sets the phase of one of the overlapped areas to be constant, and then using the system solver, estimates the phase solutions necessary for the other overlapped regions to force a global in-phase solution across the aperture. This embodiment of the image processing module 570 enables digital correction to image degradations caused by phase differences induced by atmospheric turbulence. This image correction process only requires a single frame of data with temporal data not being required for first-order corrections to take place. According to a less preferred embodiment of the present invention, series phase estimates could be generated and applied to the complex amplitudes, spatially shifting the frequency components back to generate the corrected images followed by selecting the correct phase solution based on contrast maximization. However, this approach is less computationally efficient.

The method of reconstruction may include several steps to determine image degradation caused by atmospheric turbulence. According to a particular embodiment, the method may include taking a FFT of the received intensity of a time sample of the laterally separated collimated light captured by sensor array 514. According to this particular embodiment, the image reconstruction method may further include identifying the isolated frequency terms and then spatially extracting those isolated frequency terms. According to this particular embodiment, the image reconstruction method may further include storing the extracted frequency terms in computational memory space as 2-dimensional (2D) images that have all of the other frequency information zeroed out using a binary mask. According to this particular embodiment, the image reconstruction method may further include storing the 2D images as a 3-dimensional (3D) array, with the third dimension keeping track of the aperture component number. Now that the frequency components have been extracted, the overlap regions may be computed. The overlaps regions are defined by the primary input aperture as if the secondary aperture did not exist.

According to this particular embodiment, the image reconstruction method may further include solving for the phase errors. Solving for the phase errors may be performed in the following order: (1) global tip/tilt phase errors between aperture pairs, (2) phase piston jitter corrections, and (3) deconvolve the raw, interfered image from the modulation transfer function (MTF), according to embodiments of the present invention. The MTF is comprised of the phase ramp's estimated power and noise inherent in the original digital image. Deconvolution removes the calculated MTF from the raw image. The frequency terms are then spatially shifted back to the primary, standard-image locations and summed to create the final 2D array of frequency components. The final step uses standard FFTs to transform the phase-corrected and shifted frequency terms into a reconstructed image.

Figure 8:
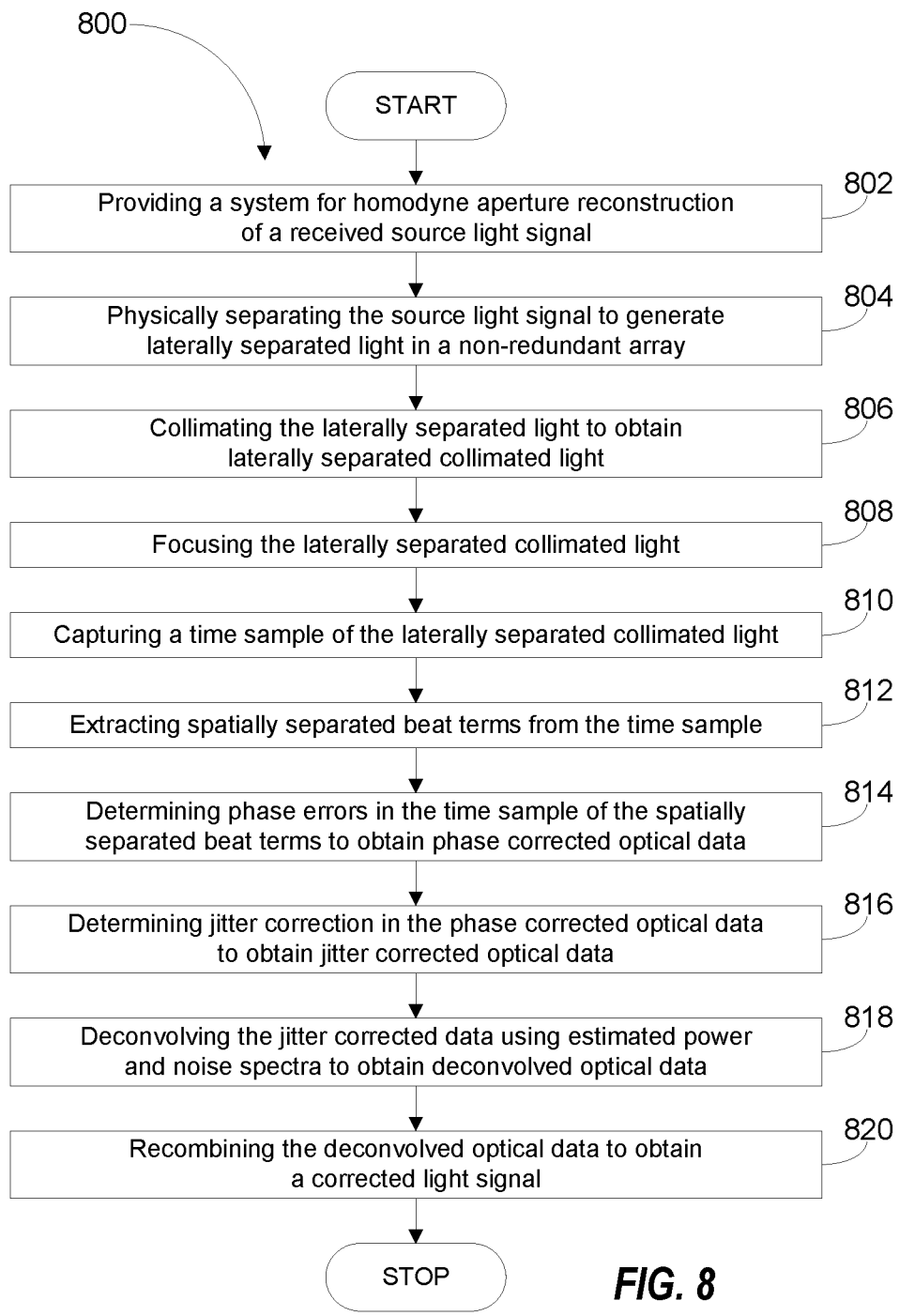
FIG. 8 is flow chart of an embodiment of a method for homodyne aperture reconstruction of a spatially encoded optical source light signal sent from an optical source, according to the present invention.

FIG. 8 is flow chart of an embodiment of a method 800 for homodyne aperture reconstruction of a spatially encoded optical source light signal sent from an optical source, according to the present invention. It will be understood that the optical source may be any passive or active optical source, not just the exemplary sources described herein. According to still another embodiment of method 800, the spatially encoded optical source light signal may include multiple spatially encoded optical source light signals within a viewing field. An embodiment of method 800 may include providing a system 802 for homodyne aperture reconstruction of a received source light signal, as shown in FIG. 8. Where the system provided 802 is uncalibrated, an embodiment of method 800 may further include calibrating the system for homodyne aperture reconstruction as described herein. According to another embodiment, the calibration may include creating an initial calibration dataset and computing initial offset shifts to obtain baseline spatial shifts.

According to one embodiment, the system may further include a multi-aperture primary beam separating interferometer. According to this embodiment, the system may further include a multi-aperture secondary beam collimating interferometer spaced apart from the primary beam separating interferometer. According to a particular embodiment the multi-aperture primary beam separating interferometer and the multi-aperture secondary beam collimating interferometer may be a matched pair of three-aperture interferometer assemblies. An example of spaced apart interferometer assemblies is shown in FIG. 11C. According to this particular embodiment, the system may further include a sensor for capturing optical image data time samples.

Referring again to FIG. 8, an embodiment of method 800 may further include physically separating the source light signal 804 to generate laterally separated light in a non-redundant array. According to one embodiment of method 800, physically separating the source light signal 804 may include passing the source light signal through the multi-aperture primary beam separating interferometer to generate the laterally separated light. Exemplary embodiments of a multi-aperture primary beam separating interferometers are the three-aperture primary aperture 502 (FIG. 6), 602 and 612 as illustrated in FIGS. 11A, 11C and 11D.

The embodiment of method 800 may further include collimating the laterally separated light 806 to obtain laterally separated collimated light. According to yet another embodiment of method 800, collimating the laterally separated light may further include passing the laterally separated light through the secondary multi-aperture beam collimating interferometer to obtain the laterally separated collimated light. Exemplary embodiments of a secondary multi-aperture beam collimating interferometer may include the three-aperture secondary interferometer 506 (FIG. 6), 606 (FIGS. 11B and 11C) and 616 (FIG. 11E). It will be further understood that "multi-aperture" is not limited to the "three-aperture" embodiments used as examples herein. Four-, five-, six- and higher order matched aperture interferometer assemblies also fall within the scope of "multi-aperture".

The embodiment of method 800 may further include focusing the laterally separated collimated light 808. According to a particular embodiment of method 800, focusing the laterally separated collimated light 808 may include focusing the laterally separated collimated light onto the sensor. The embodiment of method 800 may further include capturing a time sample 810 of the laterally separated collimated light. In a particular embodiment of method 800, capturing the time sample 810 may be accomplished with the sensor.

The embodiment of method 800 may further include extracting spatially separated beat terms 812 from the time sample. The embodiment of method 800 may further include determining phase errors 814 in the time sample of the spatially separated beat terms to obtain phase corrected optical data. According to a particular embodiment of method 800, determining phase errors 814 may include solving for any phase errors in the time sample of the spatially separated beat terms by forcing computed overlapped regions to be in phase. According to this particular embodiment of method 800, determining phase errors 814 may further include spatially placing frequency information back into correct locations as defined prior to separation.

Method 800 may further include determining jitter correction 816 in the phase corrected optical data to obtain jitter corrected optical data. Method 800 may further include deconvolving the jitter corrected data 818 using estimated power and noise spectra to obtain deconvolved optical data. Method 800 may further include recombining the deconvolved optical data 820 to obtain a corrected light signal. According to one embodiment of the present invention, method steps 804, 806, 808 correspond to input optical setup module 550 shown in FIGS. 5 and 6. According to another embodiment, method step 810 corresponds to data acquisition module 560 in FIGS. 5 and 6. According to yet another embodiment, method steps 812, 814, 816, 818 and 820 correspond to image processing module 570 shown in FIGS. 5 and 7.

According to still yet another embodiment of the present invention, a non-transitory computer media may be adapted to store computer readable software instructions implementing method 800 in conjunction with the other hardware features, for example and not by way of limitation, the input optical setup module 550 (FIG. 6) and data acquisition module 560 (FIG. 6), of the provided system 802. Having elaborated on some specific and more general embodiments of the present invention, an exemplary application of the methods and systems of the present invention will now be described.

Figures 10A, 10B:
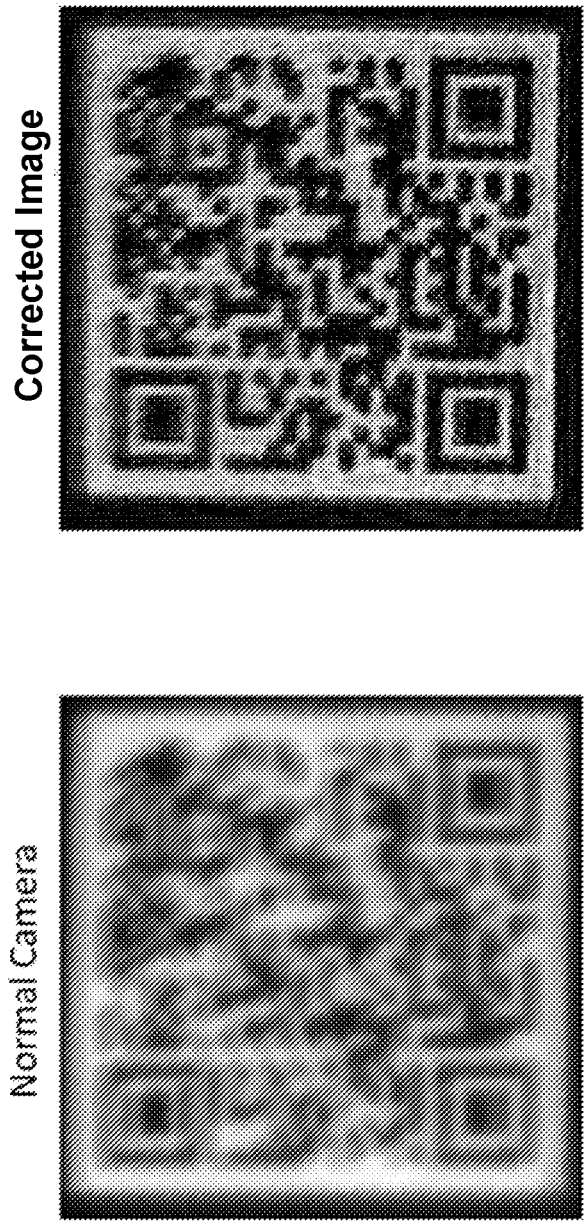
FIG. 10A is an image of a QR code that has been distorted by atmospheric turbulence as seen by a normal camera.
FIG. 10B is the same image of a QR code after correction, according to the present invention.

The following system-level example employs matrix barcodes and e-ink readers as the transmission technique in atmospheric turbulence. The "Quick Response Code" (or QR code) is one common type of matrix barcode and will be used in the examples below as the optical signal being transmitted between terminals. A QR code contains optically encoded information. Depending on the turbulence level, a normal camera may or may not be able to extract this information due to atmospheric degradation. An example of this turbulence effect seen by a normal camera is shown in FIG. 10A. The QR code shown in FIG. 10A is noticeably fuzzy and may fail to read because of the distortion caused by atmospheric turbulence. The QR code image shown in FIG. 10B is the same atmospherically distorted image after being processed according to the system and method of the present invention. As illustrated in FIG. 10B, the QR code image is well-resolved despite having passed through the same level of turbulence.

Figure 9:
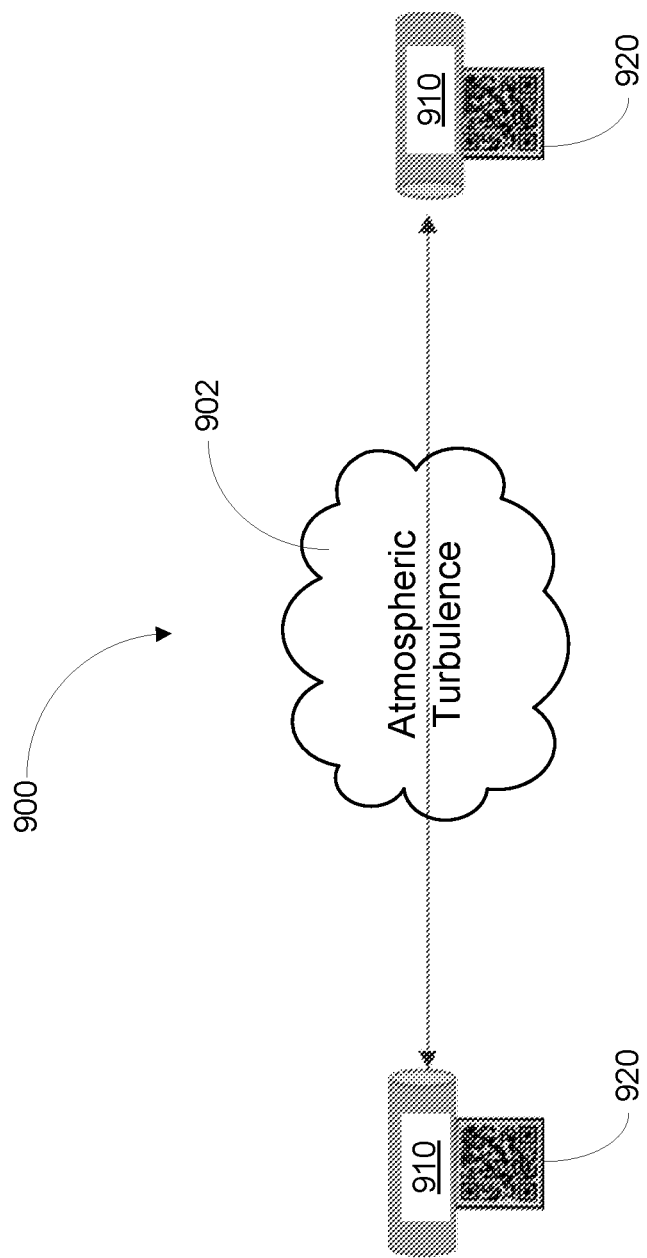
FIG. 9 is a block diagram of a particular embodiment of a bi-directional optical communications system with turbulence mitigation using homodyne encoding, according to the present invention.

Referring now to FIG. 9, a diagram of an exemplary bi-directional optical communications system 900 with turbulence mitigation using homodyne encoding is shown. The embodiment of system 900 shown in FIG. 9 may include two terminals 910, each terminal 910 including an e-ink reader capable of generating a matrix barcode, e.g., a QR code, as the optical signal to be transmitted. As described herein, such an e-ink reader is a passive optical transmitter. Being passive optical transmitters provides several advantages over active transmission, for example and not by way of limitation: system power consumption may be reduced, observation and detection by unintended parties may be reduced, or eliminated, and the emission of potentially harmful light (intense laser radiation) may be eliminated.

Both terminals 910 of bi-directional communication system 900 may be configured to point at each other along an optical path. Accordingly, terminals 910 will be able to use the receiver optics according to the present invention to view each other's e-ink reader to effectively communicate. For simplicity of illustration in FIG. 9, the fields of view 920 showing QR codes for the e-ink reader screens are displayed perpendicular to the fields of view for the terminals 910. However, in an actual embodiment the fields of view for the e-ink reader screen and the DAO terminal would be aligned along the same line of sight axis for a given transceiver (terminal 910). A single terminal 910 could view the e-ink readers from other terminals 910 simultaneously. This technique may be useful for mesh networking and information relay systems. To ensure accuracy, each end node can acknowledge that it has received the correct information before proceeding. It will be understood that more than two terminals 910 could be employed in a mesh network, according other embodiments of the present invention.

FIGS. 11A and 11B are schematic diagrams depicting embodiments of a primary beam separating 602 and secondary beam collimating 606 three-aperture interferometers, respectively, shown in relative scale, according to the present invention. The illustrated embodiment of a primary three-aperture beam separating interferometer 602 may be configured with three primary apertures 638. According to a particular embodiment, each of the three individual primary apertures 638 may be configured with primary blazed diffraction gratings, a diameter, $d_1$=12.7 mm and a center to center spacing, $s_1$=13.7 mm, relative to one another. The primary beam separating three-aperture interferometer 602 may be configured to separate the three beams in angular space, see FIG. 11C and related description herein.

Embodiments of the secondary three-aperture interferometer 606 may be configured with three secondary apertures 640. According to a particular embodiment, each of the three individual apertures 640 may be configured with secondary blazed gratings, a diameter, $d_2$=25.4 mm in diameter, center to center spacing, $s_2$=44.0 mm relative to one another and are affixed a distance, $s_3$=50 mm from corresponding primary apertures 638. Embodiments of the secondary three-aperture interferometer are configured to re-collimate the light as depicted in FIG. 11C. According to particular embodiments, the diffraction gratings in the primary apertures 638 and secondary apertures 640 are matched and may be separated by a distance of $s_3$=50 mm (as noted above), blazed with 300 lines per mm, at a blaze angle of 11.25°, a diffraction efficiency of 60%, a center wavelength of 670 nm, a bandpass of ±25 nm and a blaze arrow direction toward the beamline's center.

FIG. 11C is schematic diagram of the light paths through the primary three-aperture beam separating interferometer 602 and secondary three-aperture beam collimating interferometer 606 depicted in FIGS. 11A and 11B, respectively, according to the present invention. Light 500 received from a source (not shown) passes through the primary beam separating three-aperture interferometer 602 and becomes angularly separated light 504 directed to pass through the secondary beam collimating three-aperture interferometer 606 presenting collimated laterally separated light 508 at the output which may then be directed to focusing optics 510 (FIG. 6) and a sensor array 514 (FIG. 6) for sampling.

FIG. 11D is an image of an exemplary primary 3-aperture interferometer assembly 612, according to the present invention. As shown in FIG. 11D, the primary assembly 612 may include three individual diffraction grating apertures 638. FIG. 11E is an image of an exemplary secondary three-aperture interferometer assembly 616, according to the present invention. The illustrated images of the primary (FIG. 11D) and secondary (FIG. 11E) interferometer assemblies are shown after final integration, but are not shown in relative scale.

Before system 580 (FIG. 5) can collect general data and perform the image correction procedures described herein, an initial calibration dataset must be created and initial offset shifts require computation. These offset shifts are used for future field data collections and provide the baseline spatial shifts that are required to successfully reconstruct images across the sensor plane. All subsequent solutions are based on this calibration baseline. Exemplary calibration procedures are described with reference to FIGS. 12A to 12D, herein.

FIG. 12A is an image of an embodiment of an initial 7×7 calibration data grid, shown generally at arrow 402, according to the present invention. This embodiment of an initial calibration data grid 402 may be composed of a 7×7 grid of 50-µm point sources 404. To compile the grid of data, a 50-µm pinhole may be sequentially scanned to each of the 49 locations. FIG. 12A illustrates a complete image summation of the individual acquisitions, according to the present invention. A moiré pattern is superimposed on top of each point source 404. This interference pattern is caused by aperture separation.

FIG. 12B is an image of an embodiment of a 2D FFT 414 performed on the image intensity data shown in FIG. 12A, according to the present invention. When a 2D FFT of the raw data from the calibration data grid 402 is computed, it results in the six hexagonally-spaced frequency terms 410 surrounding the centrally-located dc term 412 illustrated in FIG. 12B. Centroid beats 406 based on the 2D FFT are shown in yellow circles, and as a visual check, predicted beat locations 408 from the secondary aperture interferometer 606 (FIG. 11B) are indicated in green circles and located within the centroid beats 406. With frequency components separated and isolated, the method of calibration according to the present invention solves for residual phase errors in the system and then computes the primary spatial shifts for moving the frequency components back to their initial locations, as dictated by the primary aperture 602 (FIG. 11A).

FIG. 12C is an image of an embodiment of the Fourier space 420 after spatially shifting the frequency information back to the correct (i.e., natural, non-diffracted) locations. More particularly, FIG. 12C illustrates the shifted centroid beat locations 416 shown in yellow circles with the predicted beats 418 from the primary aperture interferometer 602 (FIG. 11A) shown in green circles within the shifted centroid beat locations 416. FIG. 12D is an image of the normal point source images 424 from the 7×7 calibration grid 422 after compensating for inherent phase errors and then removing the moiré pattern in an embodiment of the system for homodyne aperture reconstruction 580 (FIG. 5), according to the present invention.

Embodiments of the interferometer described herein are based on a pair of three-aperture grating assemblies (see, e.g., FIGS. 11A-11E), resulting in 7 frequency regions (1 DC and 6 beat) with various overlapping regions as a result, e.g., see FIG. 12B. These overlap regions provide opportunity to identify and eliminate phase errors that occur within the imaging system.

While a pair of three-aperture grating assemblies are shown herein as an exemplary embodiment of the system present invention, higher order assemblies are also within the scope of the present invention. It will be understood that having only three pairs of matched apertures may limit the ability of embodiments of the system to solve for higher order-frequency phase errors. Accordingly, it will be further understood that incorporating more than three matched pairs of apertures will refine the solution, especially for higher order phase errors. There is no theoretical limit on the number of additional pairs of matched apertures that could be employed consistent with the teachings of the present invention. But, it also follows that such higher order interferometer assemblies will likely raise the overall cost and complexity of such an optical communications system embodiment. It is anticipated that there will be applications where such accuracy and refinement are required and thus may justify the expense of increased optical and computational complexity associated with matched pairs of apertures numbering greater than three.

Having described particular embodiments of the systems and methods for homodyne aperture reconstruction of a spatially encoded optical source light signal corrupted by atmospheric turbulence sent from a remote optical source with reference to the drawing FIGS., additional generic embodiments of the present invention will now be described. For example, an embodiment of a system for homodyne aperture reconstruction of a spatially encoded optical source light signal corrupted by atmospheric turbulence sent from a remote optical source is disclosed. The embodiment of the system may include an input optical setup module configured to receive the corrupted light signal and present a focused, laterally separated, corrupted light signal. Exemplary embodiments of an input optical setup module may include module 550 shown in FIGS. 4-6. The system embodiment may further include a data acquisition module configured to capture at least one time sample of the focused, laterally separated, corrupted light signal. Exemplary embodiments of a data acquisition module may include module 560 shown in FIGS. 4-6. The system embodiment may further include an image processing module configured to correct phase errors and jitter in the at least one time sample and generate corrected image data. Exemplary embodiments of an image processing module may include module 570 shown in FIGS. 4, 5 and 7.

According to one embodiment of the system, the spatially encoded optical source light signal may include multiple spatially encoded optical source light signals within a viewing field. For example and not by way of limitation, the field of view may include multiple QR codes or any other type of spatially encoded optical signal. According to another embodiment of the system, the input optical setup may further include a primary aperture interferometer. The embodiment of a primary aperture interferometer may be configured to receive the corrupted light signal and laterally separate the corrupted light signal. According to this particular embodiment, the system may further include a secondary aperture interferometer including three secondary apertures in communication with the primary aperture interferometer. According to this particular embodiment, the secondary aperture interferometer may be configured to collimate the laterally separated, corrupted light signal. According to this particular embodiment, the system may further include focusing optics in communication with the secondary aperture interferometer. According to this particular embodiment, the focusing optics may be configured to focus the collimated laterally separated, corrupted light signal.

According to one embodiment of the system, the primary aperture interferometer may further include three primary apertures. According to a particular embodiment, each of the three primary apertures may further include a diameter, $d_1$, of about 12.7 mm and a center-to-center spacing, $s_1$, of about 13.7 mm, relative to one another. According to another embodiment of the system, the secondary aperture interferometer may include three secondary apertures. According to a particular embodiment, each of the three secondary apertures may further include a diameter, $d_2$, of about 25.4 mm and center-to-center spacing, $s_2$, of about 44.0 mm, relative to one another. According to yet another embodiment of the system, the primary apertures and the secondary apertures may be matched and separated by a distance, $s_3$, of about 50 mm. According to still yet another embodiment of the system, the primary apertures and the secondary apertures may each be configured with a blazed diffraction grating with 300 lines per mm, a blaze angle of about 11.25°, a diffraction efficiency of about 60%, a center wavelength of about 670 nm and a blaze arrow direction toward beamline's center.

According to an embodiment of the system, the data acquisition module may further include a sensor array. According to another embodiment of the system, the data acquisition module may be configured as a visible-band camera. According to yet another embodiment of the system, the image processing module may further include a spatially separated beat terms extractor, a phase error corrector, a jitter corrector, a deconvolver and a recombiner. One particular embodiment of an image processing module is shown in FIG. 7.

An embodiment of an optical communications system including a plurality of optical transceivers in communication with each other is disclosed. According to one embodiment of the optical communications system, each transceiver may include a transmitter and a system for homodyne aperture reconstruction. According to this embodiment, the optical communications system may further include a receiver adapted for receiving a spatially encoded optical source light signal corrupted by atmospheric turbulence. According to this embodiment, the optical communications system may further include a processor in communication with the receiver. According to this embodiment, the optical communications system may further include a memory in communication with the processor. According to one particular embodiment, the memory may be configured to store a computer program adapted for implementing a method for homodyne aperture reconstruction of a spatially encoded optical source light signal corrupted by atmospheric turbulence sent from a remote optical source. It will be understood that method 800 and its variants disclosed herein are exemplary embodiments of a method for homodyne aperture reconstruction of a spatially encoded optical source light signal corrupted by atmospheric turbulence sent from a remote optical source that may be stored as a computer program in the memory, according to the present invention. It will be further understood that the spatially encoded optical source light signal may include multiple spatially encoded optical source light signals within a viewing field, according to a particular embodiment of the optical communications system.

According to another embodiment, the optical communications system may include an input optical setup module configured to receive a spatially encoded optical source light signal corrupted by atmospheric turbulence and present a focused, laterally separated, corrupted light signal. According to this embodiment, the optical communications system may further include a data acquisition module configured to capture at least one time sample of the focused, laterally separated, corrupted light signal. According to this embodiment, the optical communications system may further include an image processing module configured to correct phase errors and jitter in the at least one time sample and generate corrected image data.

It will be understood that in this disclosure the term "non-transitory computer readable storage medium" (or media) is defined to include computer readable storage media, magnetic or optical, e.g., hard disc drives, compact disc (CD), digital versatile disc (DVD), and other non-transitory semiconductor storage media such as flash drive, read only memory (ROM) and like kinds of hardware based storage of data and computer instructions that may or may not be physically portable. This is in contrast to the term "computer readable transmission media" which are comprised of electromagnetic signals per se that are of a transitory and non-permanent nature and carried on carrier waves.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the system and method embodiments for optical communications employing homodyne encoding for turbulence mitigation, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A method for homodyne aperture reconstruction of a spatially encoded optical source light signal corrupted by atmospheric turbulence sent from a remote optical source, the method comprising:
   providing a system for the homodyne aperture reconstruction of the source light signal;
   physically separating the source light signal to generate laterally separated light in a non-redundant array;
   collimating the laterally separated light to obtain laterally separated collimated light;
   focusing the laterally separated collimated light;
   capturing a time sample of the laterally separated collimated light;
   extracting spatially separated beat terms from the time sample;
   determining phase errors in the time sample of the spatially separated beat terms to obtain phase corrected optical data;
   determining jitter correction in the phase corrected optical data to obtain jitter corrected optical data;
   deconvolving the jitter corrected data using estimated power and noise spectra to obtain deconvolved optical data; and
   recombining the deconvolved optical data to obtain a corrected light signal.

2. The method according to claim 1, wherein the system comprises:
   a multi-aperture primary beam separating interferometer;
   a multi-aperture secondary beam collimating interferometer spaced apart from the primary beam separating interferometer; and
   a sensor for capturing optical image data time samples.

3. The method according to claim 2, wherein the physically separating the source light signal further comprises passing the source light signal through the multi-aperture primary beam separating interferometer to generate the laterally separated light.

4. The method according to claim 2, wherein the collimating the laterally separated light further comprises passing the laterally separated light through the secondary multi-aperture beam collimating interferometer to obtain the laterally separated collimated light.

5. The method according to claim 2, wherein the focusing the laterally separated collimated light further comprises focusing the laterally separated collimated light onto the sensor.

6. The method according to claim 2, wherein the capturing the time sample further comprises capturing the time sample with the sensor.

7. The method according to claim 2, further comprising calibrating the system for homodyne aperture reconstruction.

8. The method according to claim 7, wherein the calibrating further comprises:

creating an initial calibration dataset; and
computing initial offset shifts to obtain baseline spatial shifts.

9. The method according to claim 2, wherein the multi-aperture primary beam separating interferometer and the multi-aperture secondary beam collimating interferometer comprise a matched pair of three-aperture interferometer assemblies.

10. The method according to claim 1, wherein the determining phase errors, further comprises:
solving for any phase errors in the time sample of the spatially separated beat terms by forcing computed overlapped regions to be in phase; and
spatially placing frequency information back into correct locations as defined prior to separation.

11. A non-transitory computer readable media storing computer readable software instructions that when executed by a processor causes the processor implementing the method for homodyne aperture reconstruction of a spatially encoded optical source light signal corrupted by atmospheric turbulence sent from a remote optical source recited in claim 1.

12. The method according to claim 1, wherein the spatially encoded optical source light signal comprises multiple spatially encoded optical source light signals within a viewing field.

13. The system according to claim 12, wherein the data acquisition module further comprises a sensor array.

14. A system for homodyne aperture reconstruction of a spatially encoded optical source light signal corrupted by atmospheric turbulence sent from a remote optical source comprising:
an input optical setup module configured to receive the corrupted light signal and present a focused, laterally separated, corrupted light signal;
a data acquisition module configured to capture at least one time sample of the focused, laterally separated, corrupted light signal; and
an image processing module configured to correct phase errors and jitter in the at least one time sample and generate corrected image data, the image processing module further comprising:
a spatially separated beat terms extractor;
a phase error corrector;
a jitter corrector;
a deconvolver; and
a recombiner.

15. The system according to claim 14, wherein the spatially encoded optical source light signal comprises multiple spatially encoded optical source light signals within a viewing field.

16. The system according to claim 14, wherein the input optical setup further comprises:
a primary aperture interferometer, the primary aperture interferometer configured to receive the corrupted light signal and laterally separate the corrupted light signal;
a secondary aperture interferometer including three secondary apertures in communication with the primary aperture interferometer and configured to collimate the laterally separated, corrupted light signal; and
focusing optics in communication with the secondary aperture interferometer and configured to focus the collimated laterally separated, corrupted light signal.

17. The system according to claim 16, wherein the primary aperture interferometer further includes three primary apertures, wherein each of the three primary apertures further comprise:

a diameter, $d_1$, of about 12.7 mm; and
center-to-center spacing, $s_1$, of about 13.7 mm, relative to one another.

18. The system according to claim 17, wherein the secondary aperture interferometer includes three secondary apertures, wherein each of the three secondary apertures further comprise:
a diameter, $d_2$, of about 25.4 mm; and
center-to-center spacing, $s_2$, of about 44.0 mm, relative to one another.

19. The system according to claim 18, wherein the primary apertures and the secondary apertures are matched and separated by a distance, $s_3$, of about 50 mm.

20. The system according to claim 18, wherein the primary apertures and the secondary apertures each further comprise:
a blazed diffraction grating with 300 lines per mm;
a blaze angle of about 11.25°;
a diffraction efficiency of about 60%;
a center wavelength of about 670 nm; and
a blaze arrow direction toward beamline's center.

21. The data acquisition module, according to claim 14, wherein the data acquisition module comprises a visible-band camera.

22. An optical communications system including a plurality of optical transceivers in communication with each other, each transceiver comprising:
a transmitter; and
a system for homodyne aperture reconstruction, the system further comprising:
a receiver adapted for receiving a spatially encoded optical source light signal corrupted by atmospheric turbulence;
a processor in communication with the receiver; and
a memory in communication with the processor configured to store a computer program adapted for implementing a method for homodyne aperture reconstruction of a spatially encoded optical source light signal corrupted by atmospheric turbulence sent from a remote optical source; and
wherein the method further comprises:
providing a system for the homodyne aperture reconstruction for receiving the source light signal;
physically separating the source light signal to generate laterally separated light in a non-redundant array;
collimating the laterally separated light to obtain laterally separated collimated light;
focusing the laterally separated collimated light;
capturing a time sample of the laterally separated collimated light;
extracting spatially separated beat terms from the time sample;
determining phase errors in the time sample of the spatially separated beat terms to obtain phase corrected optical data;
determining jitter correction in the phase corrected optical data to obtain litter corrected optical data;
deconvolving the litter corrected data using estimated power and noise spectra to obtain deconvolved optical data; and
recombining the deconvolved optical data to obtain a corrected light signal.

23. The optical communications system according to claim 22, wherein the spatially encoded optical source light signal comprises multiple spatially encoded optical source light signals within a viewing field.

24. The optical communications system according to claim 22, wherein the system further comprises:
- an input optical setup module configured to receive spatially encoded optical source light signal corrupted by atmospheric turbulence and present a focused, laterally separated, corrupted light signal;
- a data acquisition module configured to capture at least one time sample of the focused, laterally separated, corrupted light signal; and
- an image processing module configured to correct phase errors and jitter in the at least one time sample and generate corrected image data.

* * * * *